No. 652,882. Patented July 3, 1900.
Y. H. BOUDREAU.
REGULATING DEVICE FOR RIDING CARTS.
(Application filed Jan. 31, 1900.)
(No Model.)

WITNESSES:

INVENTOR.
Young H. Boudreau
BY Dewey Strong & Co.
ATTORNEYS

THE NORRIS PETERS CO., PHOTO-LITHO., WASHINGTON, D. C.

UNITED STATES PATENT OFFICE.

YOUNG H. BOUDREAU, OF MODESTO, CALIFORNIA.

REGULATING DEVICE FOR RIDING-CARTS.

SPECIFICATION forming part of Letters Patent No. 652,882, dated July 3, 1900.

Application filed January 31, 1900. Serial No. 3,390. (No model.)

*To all whom it may concern:*

Be it known that I, YOUNG H. BOUDREAU, a citizen of the United States, residing at Modesto, county of Stanislaus, State of California, have invented an Improvement in Regulating Devices for Riding-Carts; and I hereby declare the following to be a full, clear, and exact description of the same.

My invention relates to an attachment for carts of that description which are used for riding and driving purposes, and is designed to relieve the disagreeable movements of such carts caused by the motion of the horse. It also serves to relieve the jerk caused by the sudden starting or stopping of the animal and reduces the tilting of the cart-body in going up or down hill.

It consists of fulcrumed plates rigidly clipped to the axle of the cart, between which plates the shafts are pivoted and turnable, a rigid bar also fixed and projecting front and back of the axle, an arched spring having the center fixed at the axle, and the ends flexibly connected with the shafts.

My invention also comprises details of construction, which will be more fully explained by reference to the accompanying drawings, in which—

Figure 1:
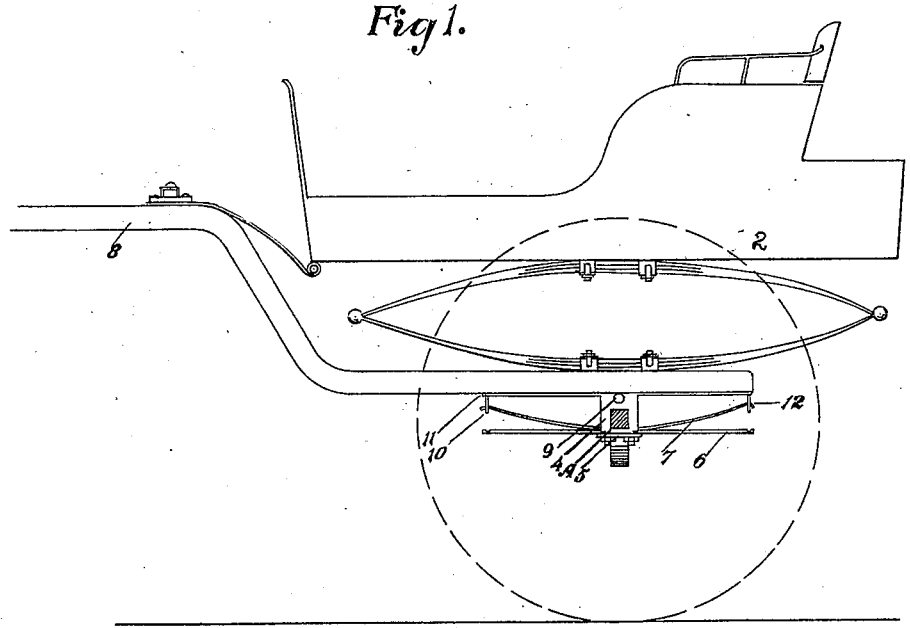
Figure 2:
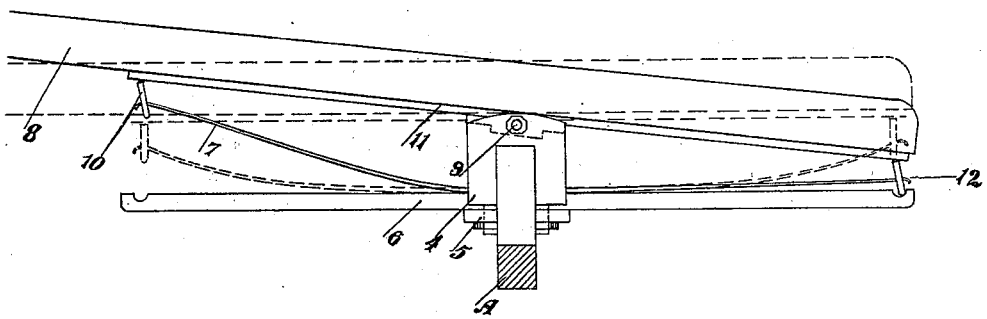

Figure 1 is a side elevation. Fig. 2 is a detail of the connection between the axle and shafts.

The axle A of the cart is preferably bent downward, so that the cart-body 2 is supported below the level of the spindles upon which the wheels turn.

4 indicates plates in the form of clips slotted and fitting over the rectangular part of the axle, having screw-threaded bolts formed at the lower end, upon which nuts are fitted. A plate 5 is bored to fit over these bolt ends, and when the nuts are screwed on this plate is clamped against the parts which are to be held in place by it.

Below the axle, as here shown, is a bar 6, and upon this bar rests a flat spring 7, having the ends turned upwardly, as shown, the center of this spring and the bar 6 lying beneath the axle A. When the plate 5 is screwed up against the bar and spring, they are firmly locked against the axle, and the clips 4 fitting over the axle, the whole are locked together.

8 indicates the shafts of the vehicle, between which the horse is harnessed. These shafts have fulcrum-pins at 9, which pass through the upper parts of the plate 4, as here shown, just above the top of the axle A, and the upturned ends of the spring 7 are adapted to press against the lower part of the shafts, so as to normally hold them in proper position relative to the wheel-axle and cart-body.

In order to reduce friction and make a freely-movable connection between the spring ends and the shafts, I have shown plates 10, having the upper ends hinged or pivoted to metal plates 11, which are fixed upon the bottom of the shafts 8 and which practically carry the journal-pins 9, upon which the shafts are turnable. These plates 10 have their lower ends transversely slotted, and the ends of the spring 7 are curved and pass through these slots, as shown at 12. Whenever the shafts tilt about the fulcrum-points, so as to approach the bar 6 at one end and move away from it at the opposite end, these swinging fulcrumed plates 10 will turn about their fulcrum-points to follow the movements of the spring ends, which, following the movements of the shafts, will lengthen the spring at the end which is compressed and will correspondingly shorten it at the end which is drawn upward. The lower edges of these plates 10 act to limit the tilting movement of the shafts 8 in case it should be excessive by striking against the ends of the bar 6.

By this construction the vertical movements of the horse, which are caused by trotting and other action of traveling and which are communicated to the shafts, are almost entirely prevented from acting upon the body of the vehicle, and the fact that the axle A is bent, so that the body is supported below the wheel-spindles, assists in relieving it from motion, because the bend in the axle forms a lever upon the lower end of which the vehicle-body and the weight carried thereby are supported, and the inertia of this weight prevents its being readily moved by sudden movements of the shafts. For the same reason if a horse starts or stops suddenly this inertia will cause the spring 7 to yield to the sudden jerk, while the vehicle-body moves more slowly and is relieved from the shock.

In going up or down hill the crank or bent axle will cause it and the vehicle-body to approximate a vertical position by gravitation, while the spring will yield to allow the shafts to which the horse is attached to tilt with relation to the body, so that in going uphill the vehicle-body will not be tilted back as much as it would with a rigid connection and will be correspondingly less tilted forward in going downhill.

Having thus described my invention, what I claim as new, and desire to secure by Letters Patent, is—

1. In a two-wheeled cart and in combination, an axle having a rigid bar fixed transversely across each end, shafts fulcrumed in line above the axle, curved springs having their center fixed above the rigid bar, and the ends pressing against the lower part of the shafts upon each side of the axle.

2. In a two-wheeled cart and in combination, a crank or bent axle upon the central portion of which the vehicle-body is supported, and the upwardly and outwardly turned ends form the wheel-spindles, clips fixed to the axles between the wheel-spindles and the crank portion, fulcrum-pins extending through the upper part of the clips and supporting the shafts by which the vehicle is drawn, rigid bars clipped beneath the axle extending parallel to and beneath the shafts, springs having the center clipped between the axle and the rigid bars, their ends upturned and forming elastic contacts with the lower part of the shafts at each side of the axle.

3. In a two-wheeled cart and in combination, a crank-axle having wheel-spindles at the outer ends, a depressed central portion upon which the vehicle-body is supported, rigid bars extending transversely beneath the axle between the spindle and the crank portion, springs having the central portion resting upon said bars and the ends curved upwardly, clips slotted to fit over the axle extending down upon each side of the springs and their supporting-bars, a clip-plate through which the screw-threaded lower ends of the clips pass, and nuts by which the bar spring and axle are clamped rigidly together, fulcrum-pins passing through the upper part of the clips and shafts to which said fulcrum-pins are connected.

4. In a two-wheeled vehicle and in combination, shafts fulcrumed above the axle, rigid bars extending beneath the axle parallel with the shafts, springs clamped between said bars and the axle having upturned ends and plates hinged beneath the shafts and forming connection with the spring ends.

5. In a two-wheeled cart, an automatic device for reducing the vehicle-body motions consisting of shafts pivotally connected above the axle ends, bars extending parallel with and beneath said shafts and the axle, springs having the centers clamped between the bars and the bottom of the axle, the ends upturned toward the shafts and plates flexibly connected with the shafts having the lower ends slotted, the spring ends passing through the slots, said plates also forming stops to limit the motion of the parts.

In witness whereof I have hereunto set my hand.

YOUNG H. BOUDREAU.

Witnesses:
S. H. NOURSE,
JESSIE C. BRODIE.